United States Patent [19]

Kessler et al.

[11] Patent Number: 4,933,430

[45] Date of Patent: Jun. 12, 1990

[54] PROCESS FOR PRODUCING POLYMERS USEFUL IN THERMOSET COATINGS AND POLYMER SO PRODUCED

[75] Inventors: Lisa M. Kessler, Township of Forsyth, Mich.; Kevin M. Scholsky, Village of Sturtevant, Wis.

[73] Assignee: S. C. Johnson & Son, Inc., Racine, Wis.

[21] Appl. No.: 356,647

[22] Filed: May 19, 1989

Related U.S. Application Data

[63] Continuation of Ser. No. 22,297, Mar. 5, 1987, abandoned.

[51] Int. Cl.$^5$ .................. C08G 69/14; C08G 63/08; C08G 67/02
[52] U.S. Cl. .................................. 528/323; 528/326; 528/354; 528/359; 528/370; 528/392; 528/393
[58] Field of Search ............... 528/323, 326, 354, 359, 528/370, 392, 393

[56] References Cited

U.S. PATENT DOCUMENTS

| | | | |
|---|---|---|---|
| 3,169,945 | 2/1965 | Hostettler et al. | 260/78.3 |
| 3,284,417 | 11/1966 | Hostettler et al. | 260/78.3 |
| 3,502,623 | 3/1970 | Harworth et al. | 260/76 |
| 3,598,791 | 8/1971 | Nieuwenhais et al. | 260/78.3 |
| 3,655,631 | 4/1972 | Fraser et al. | 260/78.3 |
| 4,506,056 | 3/1985 | Gaylor | 524/445 |
| 4,546,046 | 10/1985 | Etzell | 428/460 |

FOREIGN PATENT DOCUMENTS 1443073 7/1976 United Kingdom .

OTHER PUBLICATIONS

ASTM D 2794–84, "Resistance of Organic . . .", Aug. 31, 1984, pp. 518–520.
ASTM D 3363–74, "Film Hardness by Pencil Test," Oct. 25, 1974, pp. 670–671.
Brode et al., "Lactone Polymerization and Polymer Properties," 1972, pp. 1109–1144.
Shitoa et al., "Ionic Graft Copolymerization . . .", 1967, pp. 773–790.
Shito et al., "Ionic Gaaft Copolymerization . . .", 1968, pp. 2441–2461.
Shiota et al., "Ionic Graft Copolymerization . . .," 1968, pp. 2463–2480.
Theodore et al., "Modification of Terlic Polymers . . .," 10/82, pp. 77–81.
Encyclopedia of Polymer Sci. & Technology, vol. 11, Interscience Publishers, New York 1969, pp. 98–106.
"Ring Opening Polymerization", vol. 3, by K. J. Ivin and T. Saegusce (Eds.), Elsevier Science Pub. Co., Inc., New York (1984), pp. 461–521, 975, and 978–979.

*Primary Examiner*—Paul R. Michl
*Assistant Examiner*—Patrick A. Doody

[57] ABSTRACT

A polymerization process to produce polyol polymer useful in the formulation of thermoset coatings, including the polymer so produced, is disclosed. The polymers are characterized as having at least one main chain and a plurality of side chains attached thereto. The polymerization process comprises combining in a solvent, at an elevated temperature and for a predetermined period of time, an addition-polymerizable monomer (that is also a free-radical initiator) together with an ethylenically-unsaturated monomer (having a nucleophilic or an electrophilic moiety), to initiate addition copolymerization of the addition-polymerizable monomer with the ethylenically-unsaturated monomer, whereby propagation of the reaction forms the main chain of the polymer. Meanwhile, also combined in the solvent is a polymerizable, carbonyl carbon-containing, ringed molecule—such as a lactone—which, at the elevated temperature, has a ring portion that opens to initiate ionic-copolymerization (of the now-opened ring molecule) with the nucleophilic-containing or electrophilic-containing moiety, whereby propagation of this reaction forms the side chains of the polyol polymer. Termination of the addition-copolymerization and ionic-copolymerization reactions is effected when the polyol polymer attains a predetermined number-average and/or weight-average molecular weight. The polymerization process is characterized in that each of the main-chain and side-chain propagations occurs substantially simultaneously, relative to the other, without using a catalyst.

17 Claims, No Drawings

PROCESS FOR PRODUCING POLYMERS USEFUL IN THERMOSET COATINGS AND POLYMER SO PRODUCED

This is a continuation of co-pending application Ser. No. 07/022,297 filed on Mar. 5, 1987, now abandoned.

TECHNICAL FIELD OF THE INVENTION

The present invention is generally directed to a polymerization process for producing polymers that can be formulated into thermoset coatings. More particularly, the present invention is directed to a polymerization process, that utilizes at least two different reaction mechanisms which take place simultaneously, wherein the process produces certain preselected polymers that can be formulated into thermoset coatings. The present invention is also directed to the polymers that are produced by the instant process. These polymers can, for example, be utilized to produce thermoset coatings having a variety of desired, useful, physical properties such as superior hardness and flexibility, and excellent impact resistance as well.

BACKGROUND OF THE INVENTION

It is often desirable in a polymer-coatings application that a thermoset coating composition possess not only relatively high hardness and scratch resistance but also a relatively high degree of flexibility and impact resistance. Unfortunately, in a typical "coatings" polymer of this type, some of the parameters that control these physical properties seem to be undesirably linked. For example, when certain process variables are selectably controlled so as to produce a thermoset coating composition possessing acceptable or desired hardness and scratch resistance, such a polymer generally possesses little, if any, flexibility and impact resistance—which is of course undesirable and, in some applications, totally unacceptable. In contradistinction, a polymer that is produced so as to possess desirable flexibility and impact-resistance values typically also possesses an unacceptable hardness and/or scratch-resistance values. It is currently believed that conventional manufacturing processes cause these physical properties to be so related.

Briefly, conventional manufacturing processes can be summarized as follows. Polymeric thermoset coating compositions that can be utilized in a polymer-coatings application are typically produced from selected monomers, utilizing a series of steps. Specifically, such a polymer often comprises a main chain, and typically includes side chains attached to the main chain. The main chain and side chains, in particular, are furthermore typically formed at different times via separate reaction mechanisms, often utilizing separate reaction equipment to produce the desired polymer. U.S. Pat. Nos. 3,892,714 and 4,005,155, both to Sampson et al., disclose processes that are fairly typical of such a reaction scheme.

However, from an engineering, capital-investment, manpower, equipment-scheduling, and product-manufacturing standpoint, it would be not only desirable but also economical to effect the main-chain and the side-chain formations of such a polymer, utilizing a one-step reaction scheme.

Furthermore, it is also fairly typical, in conventional polymer coatings-manufacturing processes such as those processes mentioned above, to utilize a catalyst to effect the main-chain and/or the side-chain formation of the desired polymer product. (See, e.g., U.S. Pat. Nos. 3,892,714 and 4,005,155.)

One disadvantage of utilizing a catalyst to effect a one-step reaction is that the catalyst, which is typically utilized to effect the side-chain polymerization reaction, if also present when the main-chain polymerization reaction takes place, can undesirably interfere with the main-chain polymerization reaction. This, in turn, may result in the production of a polymer having undesirable properties, or may result in the production of an undesirable polymerization by-product that needs to be separated from the desired polymer product.

The catalyst that is utilized to effect side-chain polymerization, moreover, may cause transesterification, at the main-chain portion of the polymer, resulting in crosslinking during the polymerization process. This is undesirable because crosslinking tends to increase the viscosity of the thus-produced polymer solution, and may even result in the gellation of the polymer product or products so produced.

It would therefore further be desirable not only to produce such polymer products utilizing a one-step reaction scheme but also to be able to produce such polymer products without requiring the presence of a catalyst to do so.

We have discovered that a polymer of this type can be produced in a one-step reaction scheme which utilizes, for example, a single reaction vessel, while the main chain and side chains of such polymer are being formed simultaneously. In particular, we have discovered that a one-step reaction scheme—involving at least two reactions that take place substantially simultaneously—can be utilized to produce such a polymer.

We have also discovered that this dual-reaction mechanism can proceed without need of a catalyst.

Surprisingly, we have further discovered that by selectively controlling certain variables of the instant polymerization process we are able to produce a polymeric thermoset coating possessing not only relatively high hardness and scratch resistance but also a relatively high degree of flexibility, resiliency, and impact resistance as well.

SUMMARY OF THE INVENTION

Our present invention is directed to a polymerization process for producing a polymer useful in the formulation of a thermoset coating, and to the polymer so produced. The polymer is generally characterized as having at least one main chain and a plurality of side chains attached to the main chain, and is more fully described hereinbelow.

In our process, we contemplate combining in a solvent, at an elevated temperature and for a predetermined period of time, an (1) addition-polymerizable monomer that is also a free-radical initiator together with an (2) ethylenically-unsaturated monomer that has a nucleophilic or an electrophilic moiety.

The preferred nucleophilic moiety is hydroxyl moiety. The above-mentioned monomers are combined to initiate addition copolymerization of the addition-polymerizable monomer with the ethylenically-unsaturated monomer. Propagation by the addition-copolymerization reaction forms the main chain of the polymer mentioned above.

Meanwhile, also combined in the solvent is a polymerizable, carbonyl carbon-containing, ringed molecule—such as a lactone—which, at the elevated temperature, has a ring portion that opens in the vicinity of the carbonyl carbon thereof in response to the presence of the nucleophilic or the electrophilic moiety of the ethylenically-unsaturated monomer. This ring-opening mechanism initiates ionic-copolymerization of the polymerizable, ringed molecule—such as the lactone—with the nucleophilic-containing or electrophilic-containing moiety of the ethylenically-unsaturated monomer. Propagation by the ionic-copolymerization reaction forms the side chains of the polymer mentioned above.

Termination of both the addition-copolymerization and the ionic-copolymerization reactions is selectably effected when the above-mentioned polymer attains a predetermined number-average and/or weight-average molecular weight. The polymerization process is characterized in that each of the main-chain and side-chain propagations occurs substantially simultaneously, relative to the other, and is further characterized in that each occurs without utilizing a catalyst.

DETAILED DESCRIPTION OF THE PREFERRED EMBODIMENTS

While the present invention is susceptible to embodiment in various forms, there is hereinafter described in detail a number of examples embodying the principles of the present invention. The present disclosure, therefore, is to be considered as merely an exemplification of the present invention without limitation to the specific embodiments or examples discussed herein.

In the ensuing detailed description, certain terms will be utilized for purposes of conciseness and otherwise to elucidate the features and advantages of the present invention. These terms are defined hereinbelow.

The term "addition polymerization" as used herein relates to polymer chain-forming reactions wherein the agent that is utilized to effect formation of the polymer chain is an ionic species, or another suitably reactive substance, with either of these having at least one unpaired electron that is able to function as a "free radical". A free radical is broadly speaking a species that is capable of reacting (1) to open the double bond of an ethylenically-unsaturated monomer and (2) to attach itself to such monomer at the double bond thereof, thereby causing a polymer chain to begin growing, leaving an unpaired electron which, in turn, can function as the subsequent free radical species to further propagate the chain. Typically, in a relatively short period of time (e.g., usually a few seconds or less), several monomeric units can successively add to the thus-growing chain (via the double-bond-opening mechanism described immediately above). Finally, two of the hereinabove-described "free radical" species react with each other so as to terminate their mutual growth activity, thereby forming one or more polymer molecules. Thus, the term addition polymerization comprises discreet "initiation", "propagation", and "termination" steps.

The term "amyl" as used herein means the five-carbon aliphatic group $C_5H_{11}$, also known as pentyl. Eight isomeric arrangements (exclusive of optical isomers) are possible for an amyl moiety.

The term "carbonyl carbon" as used herein refers to that functional carbon atom which is depicted as

The term "coating", which includes the term "film", as used herein means a composition of matter that covers, or is spread over, a surface.

The terms "electrophile" and "nucleophile" as used herein are defined relative to acid-base reactions in relation to the manner in which each shares an electron. Specifically, a base donates an electron pair in covalent bonding and an acid accepts the electron pair. Such an electron-accepting acid is referred to as an electrophile, whereas an electron-donating base is referred to as a nucleophile.

The term "elevated temperature" as used herein means any temperature above room temperature (i.e. above 25° C.).

The term "free radical", broadly discussed above, is further understood to mean that addition polymerization-inducing moiety, sometimes also called an "initiator", which can at times be formed spontaneously, or which can be formed by the thermally-induced decomposition of a relatively unstable substance.

The term "film" as used herein means a relatively fine, thin-skin or coating.

The term "hydroxyl moiety" as used herein refers to that functional group depicted as —OH.

The term "ionic polymerization" as used herein typically involves the transfer of an ion, an ionic species, or an electron to (or from) a monomer or a monomeric species, resulting in the formation of an ion pair. Such ion-pair formation typically arises during the initiation step of ionic polymerization. It is currently postulated that the counter-ion of such as ion pair remains in the immediate vicinity of the growing-polymer chain-end throughout the lifetime thereof (i.e., during the propagation of the polymer chain), particularly in media of low dielectric constant. Ionic polymerization (like addition polymerization, mentioned above) thus also comprises discreet initiation, propagation, and termination steps.

The term "lactone" as used herein generally means a cyclic ester.

The term "main-chain polymerization" as used herein means initiation, propagation and termination of the main chain of the polymer, wherein the monomeric units forming the main chain are added together (typically in a random order if differing monomeric species are present) via the addition polymerization mechanism discussed above.

The term "monomer" as used herein means that polymerizable starting material from which a polymer is formed. The term "monomer" as used herein includes "oligomers" and certain other polymers, that are further polymerizable.

The term "$M_z$" as used herein is the molecular weight measure (for polymers), known as the sedimentation-average molecular weight, as defined in U.S. Pat. No. 4,529,787 to Schmidt et al. (assigned to S. C. Johnson & Son, Inc., Racine, Wisconsin) which term is hereby incorporated by reference.

The term "oligomer" as used herein means a polymer molecule which, although consisting of only a relatively few number of monomeric units, is further polymerizable. In particular, the term "oligomer" as used herein generally denotes a relatively short-chain polymer molecule comprising about 2 to about 30 monomeric units.

The term "polydispersity" as used herein means the ratio of the weight-average molecular weight to the number-average molecular weight, i.e. $M_w/M_n$; and a related term is the ratio of the sedimentation-average molecular weight to the number average molecular weight, $M_z/M_n$. The terms $M_w/M_n$ and $M_z/M_n$ are herein used as a measure of the breadth of the molecular weight distribution of the polymer produced via the present process.

The term "polymer" as used herein means a macromolecule formed by the chemical union of monomeric units. When two or more monomeric units are so utilized, the macromolecule that is formed as a result may be referred to as a copolymer, a terpolymer (if three distinct monomeric units are utilized), a tetrapolymer (if four distinct monomeric units are utilized), etc. Typically, the macromolecule that is formed includes at least one main chain and may include a plurality of side chains attached to the main chain. Crosslinking, moreover, as between the several different types of chains may be present in a variety of ways.

The term "SGA polymerization" as used herein means the simultaneous graft addition polymerization process disclosed herein. Briefly, SGA polymerization as herein defined means simultaneous main-chain and side-chain polymer formation. In particular, as the polymer main chain propagates, portions of the main chain (that have an electrophilic moiety or a nucleophilic moiety) cause the polymerizable, ringed monomeric species that is present (and that is able to ring-open) to graft onto at least some of these moieties. That is, when the nucleophilic moiety is, for example, a hydroxyl moiety (which is attached to an acrylic-based portion of the polymer main chain), and when the ringed monomeric species is, for example, a lactone such as epsilon-caprolactone (CAP), the presence of the main-ring hydroxyl moiety causes the CAP ring-portion (of the CAP molecule) to open and to graft onto the main chain of the thus-propagating polymer. The CAP-based side chain, moreover, has its own hydroxyl tail; and additional CAP monomer may graft onto the growing main chain or may further propagate the CAP-based side chain of the thus-propagating polymer.

The term "side-chain polymerization" as used herein means the initiation, propagation and termination of a side chain (of the polymer) from the main chain of the polymer. Side-chain polymerization, as discussed herein, is believed to result from ionic polymerization.

The term "thermoset polymer" as used herein means a polymer that solidifies or "sets" irreversibly upon heating. This property is usually associated with a crosslinking reaction of the molecular constituents (of the polymer), such crosslinking reaction being induced, for example, by heat, radiation or other means. In many instances, it is necessary to add to the polymer a "curing" agent, such as an organic peroxide, to effect thermosetting.

The present invention, as briefly mentioned above, is directed to a polymerization process for producing a polymer useful in formulating a thermoset coating, and is also directed to the polymer so produced. The polymer is generally characterized as having at least one main chain and a plurality of side chains attached to the main chain.

The present polymerization process contemplates combining in a solvent, at an elevated temperature and for a predetermined period of time, an (1) addition-polymerizable monomer that is also a free-radical initiator together with an (2) ethylenically-unsaturated monomer having a nucleophilic or an electrophilic moiety. The preferred nucleophilic moiety is hydroxyl moiety.

Briefly, the addition-polymerizable monomer functions as a free-radical initiator at the elevated temperature (as will be described in greater detail below). The preferred polymerizable free-radical initiator is selected from the group consisting of styrene, and other monoalkenyl aromatic monomers such as alpha-methyl styrene, vinyl toluene, tertiary-butyl styrene, and the like.

The above-mentioned monomers (i.e. the addition-polymerizable monomer and the ethylenically-unsaturated monomer) are combined in a manner so as to initiate addition copolymerization of the addition-polymerizable monomer with the ethylenically-unsaturated monomer. Preferably, ethylenically-unsaturated monomer is selected from the group consisting of an acrylate, a methacrylate, and other monomers capable of being polymerized by free-radical addition polymerization. Propagation of the addition-copolymerization reaction forms the main chain of the polymer. Moreover, additional monomeric species, such as methyl methacrylate and/or butyl acrylate, can be incorporated into the main chain if desired. Thus, the main chain of the polymer disclosed herein can comprise a number of distinct monomeric units.

Meanwhile (still referring to the present polymerization process), also combined in the solvent is a polymerizable, ringed molecule—such as a lactone or other cyclic monomer—which, at the elevated temperature, has a ring portion that opens in the vicinity of the carbonyl carbon thereof in response to the presence of the nucleophilic or the electrophilic moiety of the ethylenically-unsaturated monomer.

Preferably, the above-discussed combining steps take place in the liquid phase in, for example, a suitable reaction vessel, utilizing agitation. Still further, the solvent (without the above-described monomers) can be preheated to the desired temperature, and thereafter, the above-described monomer can be admixed thereinto or combined therewith, or in the alternative, the solvent containing the thus-admixed or thus-combined monomers can be raised from a lower temperature to the desired temperature.

The above-described ring-opening mechanism initiates ionic-copolymerization of the polymerizable, ringed molecule—for example, the above-mentioned lactone—with the nucleophilic-containing or electrophilic-containing moiety of the ethylenically-unsaturated monomer. Propagation by the ionic-copolymerization reaction forms the side chains of the polymer. Termination of both the addition-copolymerization and the ionic-copolymerization reactions is selectably effected when the polymer attains a predetermined number-average and/or weight-average molecular weight.

Preferably, termination of these reactions is effected when the above-mentioned, desired polymer attains a preselected polydispersity value, viscosity value, sedimentation-average molecular weight value, and/or a preselected glass-transition temperature ($T_g$) value.

The polymerization process is further characterized in that each of the polymer main-chain and side-chain propagation steps discussed above occurs substantially simultaneously, relative to the other, and is even further characterized in that each polymer propagation step occurs without utilizing a catalyst.

The polymer produced by the above-described process, technically referred to as a "polyol" (because it is a polyhydric alcohol), preferably has a number-average molecular weight of about 700 to about 15,000; more preferably has a number-average molecular weight of about 1,000 to about 10,000; and most preferably has a number-average molecular weight of about 1,500 to about 7,000.

Upon termination of the polymer-chain propagation step, the above-mentioned polyol polymer can be separated from the solvent, and recovered if desired.

While not wanting to be tied to theory, yet desirous of providing a complete disclosure, it is presently believed that main-chain polymerization, in accordance with one of the principles of the present invention, proceeds in a self-initiated manner when a free radical-generating ingredient—such as styrene, for example—is used as the above-discussed addition-polymerization free-radical initiator. It is therefore postulated that four molecules of the free radical-generating ingredient (e.g. styrene monomer) react spontaneously at elevated temperature to produce two molecules of an unstable Diels-Alder adduct, much as is depicted in Equation 1 below.

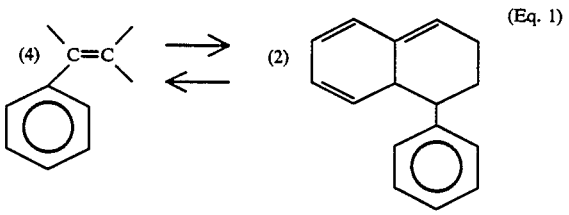
(Eq. 1)

Moreover, as is also shown in Equation 1, the free radical-generating ingredient (e.g. the styrene monomer) as well as its unstable Diels-Alder adduct are believed to co-exist as a mixture in a state of equilibrium, depending at least in part upon the temperature to which these ingredients are subjected and the amount of inhibitor present (if any inhibitor is in fact present). Raising the temperature of the equilibrium mixture above room temperature (i.e. above about 25° C.) to an elevated temperature is thus believed to convert two molecules of the unstable Diels-Alder adduct, via molecule-induced homolysis, into monoradicals that are capable of initiating polymerization, as depicted in Equation 2 below.

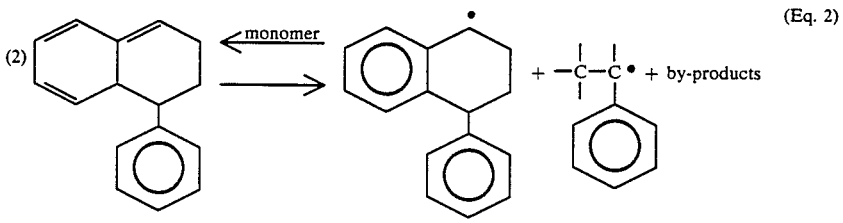
(Eq. 2)

Preferably, the elevated temperature is about 100° to about 350° C.; more preferably, the elevated temperature is about 150° to about 300° C.; and most preferably, the elevated temperature is about 190° to about 270° C.

The symbol $R\bullet$ is hereinafter used to refer to either one, or both, of the two, above-depicted chemical structures (shown in Equation 2) having the free radical-containing carbon atoms. These monoradicals are hereinafter referred to by the symbol $R\bullet$.

Meanwhile, the combining of (1) whatever residual styrene monomer that is present with (2) the ethylenically-unsaturated polymerizable monomer having the nucleophilic or the electrophilic moiety, in the presence of these free radicals, $R\bullet$, is believed to result in the main-chain growth of the polymer, as depicted in Equation 3 below.

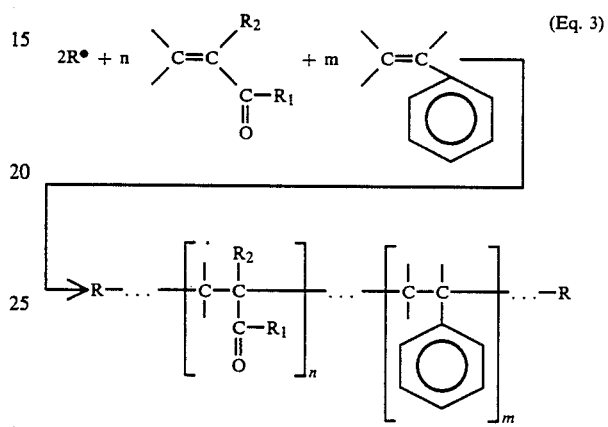
(Eq. 3)

where $R_2$ is —H, —$CH_3$, or

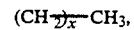
$(CH_2)_x$—$CH_3$, and where x=1 to 10.

For example, when the ethylenically-unsaturated polymerizable monomer has a nucleophilic moiety, such as hydroxyl, the symbol $R_1$ appearing in Equation 3 can be substituted by $(CH_2)_yOH$, where y=1 to 10, or can be substituted by $CH_2CH(OH)CH_3$, $CH_2CH(OH)CH_2Cl$, $CH_2CH(OH)CH_2CH_3$, 6-hydroxyhexyl, 5,6-dihydroxyhexyl, and the like.

In particular, the hydroxyalkyl acrylates, hydroxyalkyl methacrylates, and methyl alpha-hydroxyalkyl acrylates are particularly suitable; and these include hydroxypropyl acrylate, 2-hydroxyethyl acrylate, hydroxybutyl acrylate, 2-hydroxypropyl methacrylate, 2-hydroxy-3-chloro propyl methacrylate, 2,3-dihydroxy propyl methacrylate, 2,3-dihydroxy propyl acrylate, and the like, and including mixtures thereof. Hydroxyethyl acrylate and hydroxyethyl methacrylate are preferred.

The main chain of the reaction product shown in Equation 3 comprises random sequences of blocks of styrene monomeric units and nucleophilic or electrophilic moiety-containing monomeric units throughout;

and at the end portions of the chain are the above-mentioned free-radical initiator species having monomeric units that are derived from styrene (i.e., the unstable Diels-Alder molecule-induced homolysis products, mentioned above).

In addition to styrene, there are other monoalkenyl aromatic monomers, such as alpha-methyl styrene, vinyl toluene, tertiary-butyl styrene, and the like, as well as certain non-aromatic molecules, such as 1,3-butadiene, 1,3,5-hexatriene, and other like monomers, which are capable of forming unstable, Diels-Alder adducts, and that are able to function as free-radical generators in accordance with the principles of the present invention.

Meanwhile, also combining a polymerizable, ringed molecule—such as the above-mentioned, illustrative lactone—which, at the elevated temperature mentioned above, has a ring portion that opens in the vicinity of the carbonyl carbon thereof (in response to the presence of the nucleophilic or the electrophilic moiety), is believed to result in the initiation of the side-chain reaction, as depicted in Equation 4 below.

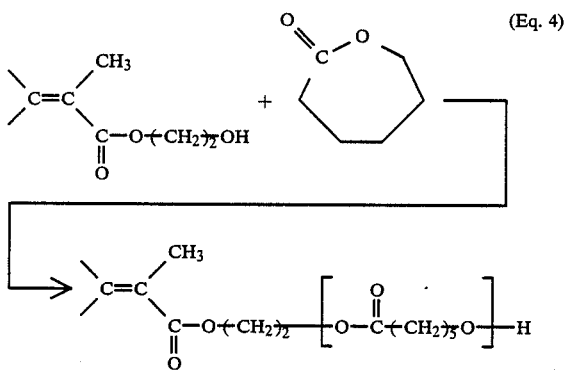

(Eq. 4)

In equation 4, epsilon-caprolactone (CAP) is depicted as being illustrative of such a lactone and 2-hydroxyethyl methacrylate (2-HEMA) is depicted as being illustrative of such a nucleophilic moiety-containing ethylenically-unsaturated monomer. In particular, the nucleophilic moiety preferably comprises a hydroxyl moiety.

In addition to the acrylate and methacrylate monomers containing hydroxyl groups, other suitable ethylenically-unsaturated monomers having hydroxyl moieties include para-hydroxystyrene, methyl alpha-hydroxyalkyl acrylates such as

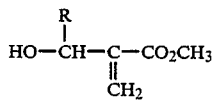

where R can be $-CH_3$, or $-C_2H_5$, methyl alpha-hydroxymethacrylate (MHMA),

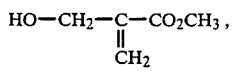

and the like.

Furthermore, initiation, in this instance, is believed to occur by nucleophilic attack i.e., by the hydroxyl group—upon the carbonyl group of the above-illustrated lactone. Thereafter, further propagation of the reaction product shown in Equation 4 is believed to continue, in a similar fashion, by way of nucleophilic attack by the hydroxyl group of newly-formed reaction product (such as that illustrated in Equation No. 4 above) upon additional CAP monomer.

The result is that the illustrative polyol polymer product discussed hereinabove has a main chain comprising randomly-oriented chain-link portions or monomeric units of styrene, and includes nucleophilic or electrophilic moiety-containing monomeric units throughout. Still further, and as briefly mentioned above, the main chain can include additional monomeric units such as methyl methacrylate and/or butyl acrylate, all such monomeric units being randomly-oriented along the polyol polymer main chain. The polyol polymer further includes the free-radical initiator monomeric units (of, e.g., styrene) at the end portions of the main chain, and still further includes the above-discussed types of randomly-arranged side chains along the main chain.

Preferably, the solvent that is utilized to achieve the addition-copolymerization and ionic-copolymerization reactions disclosed herein (hereinafter simply referred to as the above-defined and discussed "SGA polymerization process" reactions) should not contain hydroxyl groups, as such would tend to compete with any hydroxyl moiety-containing ethylenically-unsaturated monomer that may be present (as is shown in Equation 4 above, by way of example, utilizing 2-HEMA), which would result in undesirable ring-opening of the polymerizable, ringed molecule, i.e. the above-discussed illustrative lactone.

As a practical matter, however, because solvents that are utilized in accordance with the principles of the present invention are substantially all generally relatively volatile, to varying degree, a suitable solvent having a sufficiently high boiling point is typically chosen such that the solvent vapor does not overpressurize the particular polymerization reactor that is utilized to effect SGA polymerization. Accordingly, at the above-mentioned elevated temperature of about 100° to about 350° Centigrade (and when utilizing styrene as the free-radical initiator), the solvent pressure can range from approximately atmospheric pressure (i.e. about 14.7 pounds per square inch absolute) to about 1000 pounds per square inch absolute (psia); preferably can range from about atmospheric pressure to about 450 psia; and more preferably can range from about atmospheric pressure to about 300 psia. Most preferably, the solvent pressure is about 150 psia to about 200 pounds per square inch absolute at the temperature of about 100° C. to about 350° Centigrade.

Illustrative of the various kinds of solvents that can be utilized are those that are well known in the art, such as, cyclohexanone, toluene, methyl isobutyl ketone (MIBK), tetrahydrofuran, acetone, 1,3-dioxane, 1,4-dioxane, ethyl acetate, hexane, ethyl benzene, diethyl carbitol, dimethyl carbitol, diethyl cellosolve, cellosolve acetate, glyme, diglyme, triglyme, methyl amyl ketone (MAK), ethoxy ethyl acetate xylene, methyl ethyl ketone (MEK), ethyl benzene, and the like, and mixtures thereof.

The higher-boiling solvents are preferred, due to their relatively lower vapor pressures at high temperatures. In general, solvents having boiling point temperatures above about 100° C. are more preferred. Solvents having boiling points of about 150° C. are most preferred.

Preferred solvents include butyl acetate, MAK, PM acetate (propylene glycol monomethyl ether acetate), toluene, xylene, dimethyl cellosolve, glyme, diglyme, triglyme, diethyl carbitol, diethyl cellosolve, and cellosolve acetate—with PM acetate, butyl acetate, MAK, diethyl carbitol, diethyl cellosolve, and cellosolve acetate, being more preferred.

Illustrative of suitable polymerizable, carbonyl carbon-containing, ringed molecules—in addition to the above-mentioned lactones—are the following polymerizable, ringed molecules:

lactams, such as caprolactam:

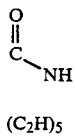

(C₂H)₅ cyclic anhydrides, such as dioxane-2,6-dione:

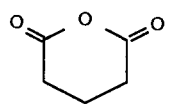

cyclic carbonates, such as ethylene carbonate [1,3-dioxolane-2-one]:

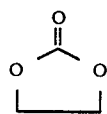

cyclic oxalates, such as ethylene oxalate [1,4-dioxane-2,3-dione]:

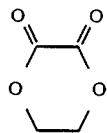

other diox-one compounds, such as 1,4-dioxane-2-one;

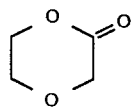

other diox-dione compounds, such as glycolide [1,4-dioxane-2,5-dione]:

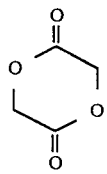

and thio-derivatives, such as epsilon-thiolactone [thioxepane-2-one]:

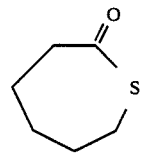

and 1,4-thioxane-3-one;

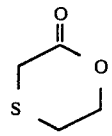

each of which has a ring portion that opens up at a respective, predetermined elevated temperature when a nucleophile or an electrophile attacks the respective carbonyl carbon atom or ring structure portion thereof.

Illustrative of the various lactones that are suitable and therefore which can be utilized, are: gamma-butyrolactone, gamma-valerolactone, ethylene carbonate, tetramethylene carbonate, 2,2-dimethyl-4-phenyl-1,3-dioxolan-5-one, alpha-n-propyl-delta-valerolactone, delta,delta-dimethyl-delta-valerolactone, 3-ethyl-1,4-dioxan-2-one, 3,3,6-trimethyl-1,4-dioxan-2-one, tetramethyl glycolide, tetraphenyl glycolide, and 3-oxa-epsilon-caprolactone.

Preferred lactones include beta-propiolactone, alpha,alpha-bis(chloromethyl)propiolactone, beta-butyrolactone, delta-valerolactone, alpha,beta,gamma-trimethoxy-delta-valerolactone, 1,4-dioxane-2-one, glycolide, lactide, 1,4-dithiane-2,5-dione, trimethylene carbonate, neopentyl carbonate, ethylene oxalate, beta-methyl-epsilon-isopropyl-epsilon-caprolactone, propylene oxalate, epsilon-caprolactone, lactones of 4-hydroxycyclohexanecarboxylic acid, cis-disalicylide, di-o-cresotide, and trisalicylide.

Lactones most preferred—such as epsilon-caprolactone, beta-propiolactone, and beta-butyrolactone—are characterized by the following formula:

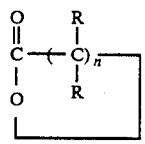

where R is hydrogen, alkyl, alkoxy, aryl, cycloalkyl, alkaryl, or aralkyl, where n is 3 to 11, and wherein at least six of the R groups are hydrogen atoms.

The ethylenically-unsaturated monomer is preferably an "acrylic monomer", wherein the term "acrylic monomer" as employed herein includes acrylic acid and methacrylic acid, esters of acrylic acid and methacrylic acid, and derivatives and mixtures thereof.

Examples of suitable acrylic monomers include the following methacrylate esters: methyl methacrylate, ethyl methacrylate, n-propyl methacrylate, n-butyl methacrylate, isopropyl methacrylate, isobutyl methacrylate, n-amyl methacrylate, n-hexyl methacrylate, isoamyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethylbutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, and tetrahydropyranyl methacrylate.

Other suitable acrylic monomers include methacrylic acid derivatives such as: methacrylic acid and its salts, methacrylonitrile, methacrylamide, N-methylmethacrylamide, N-ethylmethacrylamide, N,N-diethylmethacrylamide, N,N-dimethylmethacrylamide, N-phenylmethacrylamide, and methacrolein.

Typical acrylate esters employed include: methyl acrylate, ethyl acrylate, n-propyl acrylate, isopropyl acrylate, n-butyl acrylate, and n-decyl acrylate.

Acrylic acid derivatives employed as the acrylic monomer include: acrylic acid and its salts, acrylonitrile, acrylamide, methyl alpha-cloroacrylate, methyl 2-cyanoacrylate, N-ethylacrylamide, N,N-diethylacrylamide, and acrolein.

The acrylic monomer can also include acrylates or methacrylates containing cross-linkable functional groups, such as carboxyl, amino, isocyanate, glycidyl, epoxy, allyl, and the like.

Esters of methacrylic acid or acrylic acid containing a suitable, condensable cross-linkable functional group may be used as the monomer. Among such esters are t-butylaminoethyl methacrylate, isopropylidene glyceryl methacrylate, and oxazolidinylethyl methacrylate.

The ethylenically unsaturated monomer containing an hydroxyl group may be an unsaturated alcohol such as allyl alcohol, an alkylol acrylamide or methacrylamide—such as methylol acrylamide or methylol methacrylamide—or an unsaturated hydroxyalkyl ester. Preferably, the hydroxyl-containing unsaturated monomer is an ethylenically-unsaturated hydroxyalkyl ester.

Reaction time to effect the addition-copolymerization reaction can vary from about 30 minutes to about 12 hours, depending upon reaction temperatures, the various equilibria of reacting species, quantity and type of ring-opening polymerizable species (or ingredients) added, etc.

The following examples are set forth to illustrate more clearly, to one skilled in the art, the principles and practice of this invention. As such, they are not intended to limit the invention but rather are merely illustrative of certain aspects of the various preferred embodiments. In these examples, the molecular weight of the polyol polymer product was determined by Gel Permeation chromatography, using: a Waters 150C Chromatograph at 35° C., a total of five "micro" (i.e. $10^{-6}$ meters) Styragel columns (i.e. $1 \times 10^5$, $1 \times 10^4$, $1 \times 10^3$, 500, and 100 Angstroms, pore sizes), and tetrahydrofuran as the solvent. The flow rate was 1 ml/min, and 200 microliters of a 0.2 wt.-% solution was injected.

Thermal analyses were performed using a Du Pont Instrument 1090B/910 differential scanning calorimeter. The glass-transition temperature (Tg) was deemed to be the temperature at the mid-point of the overall change in heat capacity associated with Tg.

EXAMPLE 1

ONE METHOD OF MAKING THE POLYOL POLYMER 150 grams of PM acetate was introduced into an agitated 2-liter pressurized reactor, via an addition line, and was thereafter heated to a temperature of about 225° Centigrade. A monomer mixture comprising 350 grams of styrene, 87.5 grams of 2-HEMA and 153.5 grams of CAP was then added, via the addition line, to the 225° C. PM acetate solvent over a period of about 1 hour. Upon completion of the addition of the monomer mixture, the addition line was flushed with about 47.5 grams of PM acetate. Thereafter, the SGA polymerization was allowed to run its course in the 2-liter reactor for about 4 hours. During the course of the polymerization reaction, samples were removed at one hour intervals for analysis by gas chromatography (GC) and gel permeation chromatography (GPC).

The percent-conversion of monomer to polyol polymer, together with the weight-average molecular weight of the polymer, $M_w$, as a function of reaction time (as determined by GC and GPC) can be summarized as follows:

TABLE I

| POLYMER CONVERSION RATES | | | | |
|---|---|---|---|---|
| Reaction Time, | | % Conversion of Monomer to Polymer, based upon: | | |
| Minutes | $M_w$ | Styrene | 2-HEMA | Caprolactone |
| 60 | 11600 | 94 | 99 | 27 |
| 120 | 12400 | 98 | 99 | 41 |
| 180 | 13400 | 99 | 99 | 73 |
| 240 | 14200 | 100 | 100 | 86 |

Upon completion of the reaction, the hot polymer solution was removed from the reactor and allowed to cool. It was then analyzed by GPC and found to have a number-average molecular weight ($M_n$) of 3600, a weight-average molecular weight ($M_w$) of 14200, a sedimentation-value molecular weight ($M_z$) of 28900, and polydispersity and related value ratios of $M_w/M_n = 3.94$ and $M_z/M_n = 8.03$, respectively. The viscosity of the polymer solution at room temperature (i.e., about 25° C.) was 49600 centipoises (cP), as determined using a Brookfield viscometer. The percent-solids of the polyol polymer was 81 wt.-%. Successive dilutions of the polymer solution, made using additional PM acetate solvent, produced the following percent solids-viscosity profile:

TABLE II

| VISCOSITY PROFILE | |
|---|---|
| % Solids Polymer | Brookfield Viscosity (cP) |
| 81% | 49600 |
| 75% | 10700 |
| 70% | 5600 |
| 65% | 4400 |
| 60% | 2135 |

The glass-transition temperature (Tg) of the polyol polymer, after separation from the solvent, was found to be −7° C. (as determined by differential scanning calorimeter (DSC)).

EXAMPLE 2

ANOTHER METHOD OF MAKING THE POLYMER

A procedure, similar to that of EXAMPLE 1, was used to prepare EXAMPLE 2, except that the reaction temperature (of EXAMPLE 2) was 250° C. instead of 225° C. and the reaction time was 2 hours instead of 4 hours. During the course of the polymerization reaction, samples were removed at 45 min., 60 min., 90 min., and 120 min. intervals, for GPC and GC analyses. The percent-conversion of monomer to polyol polymer together with the $M_w$ value of the polymer were monitored during the course of the reaction; and these values can be summarized as follows:

TABLE III:

| POLYMER CONVERSION RATES | | | | |
|---|---|---|---|---|
| Reaction Time, Minutes | $M_w$ | % Conversion of Monomer to Polymer, based upon: | | |
| | | Styrene | 2-HEMA | Caprolactone |
| 45 | 5010 | 96 | 99 | 86 |
| 60 | 5080 | 97 | 99 | 93 |
| 90 | 5090 | 98 | 99+ | 95 |
| 120 | 5310 | 99 | 99+ | 97 |

Upon completion of the polymerization reaction, the polymer product was allowed to cool to room temperature. GPC analysis indicated the following: $M_n = 1870$, $M_w = 5310$, $M_z = 28900$, $M_w/M_n = 2.84$, and $M_z/M_n = 15.45$. The viscosity of the polymer product at room temperature was found to be 2800 cP as determined by Brookfield viscometer. The percent-solids wt.-% of the polyol polymer, based upon the total weight of the polymer-containing solution, was 74%. Successive dilutions of the polymer solution, made using additional PM acetate solution, produced the following percent solids-viscosity profile:

TABLE IV

| VISCOSITY PROFILE | |
|---|---|
| % Solids Polymer | Brookfield Viscosity (cP) |
| 74% | 2800 |
| 70% | 1750 |
| 65% | 683 |
| 60% | 567 |

The Tg value of the polyol polymer, after separation from the solvent, was found to be −12° C. (as determined by DSC).

EXAMPLE 3

YET ANOTHER METHOD OF MAKING THE POLYMER

A procedure similar to that of EXAMPLE 1 was used to prepare EXAMPLE 3, except that the reaction was performed at 240° C. for 1 hour. During the course of the polymerization reaction, samples were removed at 5 min., 30 min., and 60 min. intervals, for GPC and GC analyses. The results can be summarized as follows:

TABLE V

| POLYMER CONVERSION RATES | | | | |
|---|---|---|---|---|
| Reaction Time, Minutes | $M_w$ | % Conversion of Monomer to Polymer, based upon: | | |
| | | Styrene | 2-HEMA | Caprolactone |
| 5 | 5140 | 86 | 92 | 52 |
| 30 | 5600 | 95 | 98 | 79 |
| 60 | 5710 | 97 | 99 | 93 |

Upon completion of the reaction, the polymer product was allowed to cool to room temperature. GPC analysis indicated the following: $M_n = 1930$, $M_w = 5710$, $M_z = 14000$, $M_w/M_n = 2.96$, and $M_z/M_n = 7.25$.

The viscosity of the polymer product, at room temperature, was found to be 23500 cP as determined by Brookfield viscometer. The percent-solids wt.-% of the polyol polymer, based upon the total weight of the polymer-containing solution was 80%. Successive dilutions of the polymer solution, made using PM acetate solvent, produced the following percent solids-viscosity profile:

TABLE VI

| VISCOSITY PROFILE | |
|---|---|
| % Solids Polymer | Brookfield Viscosity (cP) |
| 80 | 23500 |
| 75 | 4120 |
| 70 | 2620 |
| 65 | 1420 |

The Tg value of the polyol polymer, after separation from the solvent, was found to be −8° C. (as determined by DSC).

EXAMPLE 4

STILL ANOTHER METHOD OF MAKING THE POLYMER

A procedure similar to that of EXAMPLE 1 was used to prepare EXAMPLE 4, except that the reaction was performed at 265° C. for 1.5 hours. During the course of the polymerization reaction, samples were periodically removed for GPC and GC analyses, the results of which can be summarized as follows:

TABLE VII

| POLYMER CONVERSION RATES | | | | |
|---|---|---|---|---|
| Reaction Time, Minutes | $M_w$ | % Conversion of Monomer to Polymer, based upon: | | |
| | | Styrene | 2-HEMA | Caprolactone |
| 5 | 3710 | 85 | 91 | 54 |
| 30 | 3880 | 95 | 98 | 65 |
| 45 | 4020 | 97 | 99 | 90 |
| 60 | 3990 | 97 | 99 | 94 |
| 90 | 4060 | 98 | 99 | 96 |

Upon completion of the polymerization reaction, the polyol polymer product was allowed to cool to room temperature. GPC analysis indicated the following: $M_n = 1460$, $M_w = 4060$, $M_z = 19900$, $M_w/M_n = 2.78$, and $M_z/M_n = 13.63$.

The viscosity of the polymer product at room temperature was found to be 590 cP, as determined by Brookfield viscometer. The percent-solids wt.-% of the polyol polymer, based upon the total weight of the polymer-containing solution, was 72%. Successive dilutions of the polymer solution, made using PM acetate solvent, produced the following % solids-viscosity profile:

TABLE VIII

| VISCOSITY PROFILE | |
| --- | --- |
| % Solids Polymer | Brookfield Viscosity (cP) |
| 72 | 11080 |
| 70 | 783 |
| 65 | 577 |
| 60 | 353 |

The Tg value of the polyol polymer, after separation from the solvent, was found to be −17° C. (as determined by DSC).

EXAMPLE 5

YET ANOTHER METHOD OF MAKING THE POLYMER

A procedure similar to that of EXAMPLE 1 was used to prepare EXAMPLE 5, except that the reaction was performed at 280° C. for 1 hour. During the course of the polymerization reaction, samples were removed periodically, for GPC and GC analyses, the results of which can be summarized as follows:

TABLE IX

| POLYMER CONVERSION RATES | | | | |
| --- | --- | --- | --- | --- |
| Reaction Time, | | % Conversion of Monomer to Polymer, based upon: | | |
| Minutes | $M_w$ | Styrene | 2-HEMA | Caprolactone |
| 30 | 2070 | 97 | 98 | 94 |
| 45 | 2180 | 97 | 98 | 95 |
| 60 | 2250 | 98 | 99 | 96 |

Upon completion of the polymerization reaction, the polyol polymer product was allowed to cool to room temperature. GPC analysis indicated the following: $M_n=870$, $M_w=2250$, $M_z=25080$, $M_w/M_n=2.58$, and $M_z/M_n=28.8$.

The viscosity of the polymer product at room temperature was found to be 590 cP, as determined by Brookfield viscometer. The percent-solids wt.-% of the polyol polymer, based upon the total weight of the polymer-containing solution, was 74%. Successive dilutions of the polymer solution, made using PM acetate solvent, produced the following percent solids-viscosity profile:

TABLE X

| VISCOSITY PROFILE | |
| --- | --- |
| % Solids Polymer | Brookfield Viscosity (cP) |
| 74% | 590 |
| 70% | 320 |
| 65% | 227 |
| 60% | 146 |

The Tg value of the polyol polymer, after separation from the solvent, was found to be −34° C. (as determined by DSC).

EXAMPLE 6

STILL ANOTHER METHOD OF MAKING THE POLYMER

A procedure similar to that of EXAMPLE 1 was used to prepare EXAMPLE 6, except that the reaction was performed at 200° C. for 6.5 hours.

During the course of the polymerization reaction, samples were removed periodically, for GPC and GC analyses, the results of which can be summarized as follows:

TABLE XI

| POLYMER CONVERSION RATES | | | | |
| --- | --- | --- | --- | --- |
| Reaction Time, | | % Conversion of Monomer to Polymer, based upon: | | |
| Minutes | $M_w$ | Styrene | 2-HEMA | Caprolactone |
| 60 | 17,500 | 92 | 97 | 27 |
| 180 | 19,000 | 98 | 100 | 79 |
| 240 | 20,000 | 99 | 100 | 89 |
| 300 | 20,400 | 99 | 100 | 93 |
| 360 | 21,000 | 99 | 100 | 96 |

Upon completion of the polymerization reaction, the polyol polymer product was allowed to cool to room temperature. GPC analysis indicated the following: $M_n=4170$, $M_w=21000$, $M_z=43000$, $M_w/M_n=5.05$, and $M_z/M_n=10.3$.

The viscosity of the polymer product at room temperature was found to be greater than 2,000 Poise, as determined by Brookfield viscometer. The percent-solids wt.-% of the polyol polymer, based upon the total weight of the polymer-containing solution, was found to be 75%. Successive dilutions of the polymer solution, made using PM acetate solvent, produced the following percent solids-viscosity profile:

TABLE XII

| VISCOSITY PROFILE | |
| --- | --- |
| % Solids Polymer | Brookfield Viscosity |
| 75 | >2000 Poise |
| 70 | 357 Poise |
| 65 | 20000 cP |
| 60 | 8680 cP |

The Tg value of the polyol polymer, after separation from the solvent, was found to be 13° C. (as determined by DSC).

EXAMPLE 7

YET ANOTHER METHOD OF MAKING THE POLYMER

A procedure similar to that of EXAMPLE 1 was used to prepare EXAMPLE 7, except that the monomer mixture was composed of 350 grams of styrene, 87.5 grams of 2-HEMA and 76.7 grams of caprolactone (CAP). Also, the polymerization reaction was run for 3.5 hours instead of 4 hours. During the course of the polymerization reaction, samples were periodically removed for GPC and GC analyses, the results of which can be summarized as follows:

TABLE XIII

| POLYMER CONVERSION RATES | | | | |
| --- | --- | --- | --- | --- |
| Reaction Time, | | % Conversion of Monomer to Polymer, based upon: | | |
| Minutes | $M_w$ | Styrene | 2-HEMA | Caprolactone |
| 60 | 10500 | 90 | 98 | 46 |
| 120 | 10900 | 98 | 100 | 63 |
| 180 | 11300 | 99 | 100 | 78 |
| 210 | 11600 | 99 | 100 | 86 |

Upon completion of the polymerization reaction, the polyol polymer product was allowed to cool to room temperature. GPC analysis indicated the following: $M_n=3140$, $M_w=11600$, $M_z=23800$, $M_w/M_n=3.67$, and $M_z/M_n=7.57$.

The viscosity of the polymer product material at room temperature was found to be greater than about 2000 Poise, as determined by Brookfield viscometer.

The percent-solids wt.-% of the polyol polymer, based upon the total weight of the polymer-containing solution, was found to be 82%. Successive dilutions of the polymer solution, made using PM acetate solvent, produced the following percent solids-viscosity profile:

TABLE XIV

VISCOSITY PROFILE

| % Solids Polymer | Brookfield Viscosity |
|---|---|
| 82 | >2000 Poise |
| 70 | 48400 cP |
| 65 | 38500 cP |
| 60 | 13300 cP |

The Tg value of the polyol polymer, after separation from the solvent, was found to be 12° C. (as determined by DSC).

EXAMPLE 8

STILL ANOTHER METHOD OF MAKING THE POLYMER

A procedure similar to that of EXAMPLE 1 was used to prepare EXAMPLE 8, except that the monomer mixture was composed of 350 grams of styrene, 87.5 grams of 2-HEMA and 230.2 grams of CAP. Also, the polymerization reaction was run for 5.5 hours instead of 4 hours. During the course of the reaction, samples were periodically removed for GPC and GC analyses, the results of which can be summarized as follows:

TABLE XV

POLYMER CONVERSION RATE

| Reaction Time, Minutes | $M_w$ | % Conversion of Monomer to Polymer, based upon: | | |
|---|---|---|---|---|
| | | Styrene | 2-HEMA | Caprolactone |
| 60 | 6650 | 95 | 99 | 63 |
| 120 | 7549 | 98 | 99 | 89 |
| 180 | 7970 | 98 | 99 | 94 |
| 240 | 8280 | 99 | 99 | 96 |
| 300 | 8370 | 99 | 99 | 97 |
| 330 | 8480 | 99 | 99 | 97 |

Upon completion of the polymerization reaction, the polyol polymer product was allowed to cool to room temperature. GPC analysis indicated the following: $M_n = 1990$, $M_w = 8480$, $M_z = 22500$, $M_w/M_n = 4.25$, and $M_z/M_n = 11.3$.

The viscosity of the polymer product at room temperature was found to be about 4030 cP as determined by Brookfield viscometer. The percent-solids wt.-% of the polyol polymer, based upon the total weight of the polymer-containing solution, was found to be 74%. Successive dilutions of the polymer solution, made using PM acetate solvent, produced the following percent solids-viscosity profile:

TABLE XVI

VISCOSITY PROFILE

| % Solids Polymer | Brookfield Viscosity (cP) |
|---|---|
| 74 | 4030 |
| 70 | 2230 |
| 65 | 1025 |
| 60 | 570 |

The Tg value of the polyol polymer, after separation from the solvent, was found to be −36° C. (as determined by DSC).

EXAMPLE 9

ONE METHOD OF CURING THE POLYMER, INCLUDING THE PHYSICAL PROPERTIES OF THE POLYMER SO CURED 25 grams of the polyol polymer, produced in accordance with EXAMPLE 1, was formulated into a thermosetting coating as follows:

4.38 grams of melamine (an amino resin) was added to the polymer-containing solution, together with about 0.146 grams of para-toluenesulfonic acid. (The melamine functions as a polymer-curing ingredient, and the acid functions as a catalyst.) After mixing for 120 minutes, the polymer mixture was applied to a cold-rolled steel substrate, and then baked at a temperature of 150° C. for 25 minutes. During this baking step, substantially all of the solvent present in the curing polymer was driven off, thereby forming a coating having a thickness of about 2 mils. Such coating exhibited a reverse-impact resistance of 104 in.-lbs., a direct-impact resistance of 116 in.-lbs., a Konig hardness of 146, and a pencil hardness of 2H. [See, e.g., ASTM Testing Procedure Nos. D 2794-84 and D 3363-74.]

EXAMPLE 10

THE PHYSICAL PROPERTIES OF ANOTHER POLYMER SO CURED 25 grams of the polyol polymer, produced in accordance with EXAMPLE 2, was formulated into a thermoset coating, as described in EXAMPLE 9. The final, melamine-cured coating exhibited a reverse-impact resistance of 116 in.-lbs., a direct-impact resistance of 120 in.-lbs., a Konig hardness of 97, and a pencil hardness of H.

EXAMPLE 11

THE PHYSICAL PROPERTIES OF YET ANOTHER POLYMER SO CURED 25 grams of the polyol polymer, produced in accordance with EXAMPLE 3, was formulated into a thermoset coating, as described in EXAMPLE 9. The final, melamine-cured coating exhibited a reverse-impact resistance of 108 in.-lbs., a direct-impact resistance of 120 in.-lbs., a Konig hardness of 114, and a pencil hardness of H.

EXAMPLE 12

THE PHYSICAL PROPERTIES OF STILL ANOTHER POLYMER SO CURED 25 grams of the polyol polymer, produced in accordance with EXAMPLE 4, was formulated into a thermoset coating, as described in EXAMPLE 9. The final, melamine-cured coating exhibited a reverse-impact resistance of 132 in.-lbs., a direct-impact resistance of 136 in.-lbs., a Konig hardness of 52, and a pencil hardness of HB-F.

EXAMPLE 13

THE PHYSICAL PROPERTIES OF STILL YET ANOTHER POLYMER SO CURED 25 grams of the polyol polymer, produced in accordance with EXAMPLE 5, was formulated into a thermoset coating, as described in EXAMPLE 9. The final, melamine-cured coating exhibited a reverse-impact resistance of 100 in.-lbs., a direct-impact resistance of less than 36 in.-lbs., a Konig hardness of 11, and a pencil hardness of 4B.

EXAMPLE 14

THE PHYSICAL PROPERTIES OF YET ANOTHER POLYMER SO CURED 25 grams of the polyol polymer, produced in accordance with EXAMPLE 6, was formulated into a thermoset coating, as described in EXAMPLE 9. The final, melamine-cured coating exhibited a reverse-impact resistance of 96 in.-lbs., a direct-impact resistance of 112 in.-lbs., a Konig hardness of 148, and a pencil hardness of 2H.

EXAMPLE 15

THE PHYSICAL PROPERTIES OF STILL ANOTHER POLYMER SO CURED 25 grams of the polyol polymer, produced in accordance with EXAMPLE 7, was formulated into a thermoset coating, as described in EXAMPLE 9. The final, melamine-cured coating exhibited a reverse-impact resistance of 16 in.-lbs., a direct-impact resistance of 36 in.-lbs., a Konig hardness of 155, and a pencil hardness of 2H.

EXAMPLE 16

THE PHYSICAL PROPERTIES OF YET ANOTHER POLYMER SO CURED 25 grams of the polyol polymer, produced in accordance with EXAMPLE 8, was formulated into a thermoset coating, as described in EXAMPLE 9. The final, melamine-cured coating exhibited a reverse-impact resistance of 144 in.-lbs., a direct-impact resistance of 88 in.-lbs., a Konig hardness of 22, and a pencil hardness of B.

EXAMPLE 17

ANOTHER METHOD OF CURING THE POLYMER

Another batch of polyol polymer was produced in accordance with the procedure of EXAMPLE 1, except that, before the polyol polymer was separated from the solvent, 6.1 grams of isocyanate (a polymer-curing ingredient) was added to 20 grams of the polymer-containing solution. After about 120 minutes of mixing, the polymer mixture was applied to another cold-rolled steel substrate and then baked at 150° C. for about 35 minutes. During this baking step, substantially all of the solvent present on the curing polymer was driven off, thereby forming a coating having a thickness of about 2 mils. Such coating exhibited a reverse-impact resistance of 160 in.-lbs., a direct-impact resistance of 160 in.-lbs., a Konig hardness of 124, and a pencil hardness of H-2H.

EXAMPLE 18

THE PHYSICAL PROPERTIES OF YET ANOTHER ISOCYANATE-CURED POLYMER 20 grams of the polyol polymer, described in EXAMPLE 3, was formulated into a thermoset coating and cured on steel panels, utilizing the procedure described in EXAMPLE 17. The final isocyanate-cured coating exhibited a reverse-impact resistance of greater than 160 in.-lbs., a direct-impact resistance of greater than 160 in.-lbs., a Konig hardness of 88, and a pencil hardness value of B.

EXAMPLE 19

THE PHYSICAL PROPERTIES OF STILL ANOTHER ISOCYANATE-CURED POLYMER 20 grams of the polyol polymer, described in EXAMPLE 6, was formulated into a thermoset coating and cured on steel panels, utilizing the procedure described in EXAMPLE 17. The final, isocyanate-cured coating exhibited a reverse-impact resistance of greater than 160 in.-lbs., a direct-impact resistance of greater than 160 in.-lbs., a Konig hardness of 120, and a pencil hardness value of 2H.

EXAMPLE 20

THE PHYSICAL PROPERTIES OF YET ANOTHER ISOCYANATE-CURED POLYMER 20 grams of the polyol polymer, described in EXAMPLE 7, was formulated into a thermoset coating and cured on steel panels, utilizing the procedure described in EXAMPLE 17. The final, isocyanate-cured coating exhibited as reverse-impact resistance of greater than 160 in.-lbs., a direct-impact resistance of greater than 160 in.-lbs., a Konig hardness of 140, and a pencil hardness of H.

In order to further distinguish polyol polymers produced by the instant SGA polymerization process from polyol polymers produced by prior-art processes, uncured polyol polymer, made in accordance with EXAMPLES 1 and 3 of U.S. Pat. No. 3,892,714, together with uncured polyol polymer, made in accordance with EXAMPLES 1 and 3–5 of U.S. Pat. No. 4,005,155, were respectively made, and the physical properties were thereafter compared to uncured polyol polymer which was made in accordance with EXAMPLES 1–8 of the present patent application. The results of the comparison are presented and summarized below.

EXAMPLE 21

COMPARISON OF UNCURED POLYOL POLYMERS

A batch of polyol polymer was prepared, in accordance with the procedures set forth in EXAMPLES 1 and 3 of U.S. Pat. No. 4,005,155, for the purpose of comparing the prior-art polyol to polyol polymer produced by the method of the present invention. Upon completion of the polymerization reaction described in U.S. Pat. No. 4,005,155, the prior-art polyol polymer produced as a result was found to possess the following physical properties: $M_n = 14370$, $M_w = 199360$, $M_z = 493490$, $M_w/M_n = 13.86$, and $M_z/M_n = 34.33$.

To compare the percent solids-viscosity value of this prior-art polyol polymer (to that of EXAMPLES 1 through 8 of this disclosure), solvent was removed from the solution containing the prior-art polyol polymer, by placing the polymer-containing solution in a vacuum oven at 25° C. The prior-art polyol polymer was then removed, the percent-solids wt.-% of the prior-art polyol polymer determined gravimetrically, and its viscosity determined via a Brookfield viscometer. The prior-art polyol exhibited the following percent solids-viscosity value:

TABLE XVII

| PRIOR-ART POLYOL POLYMER VISCOSITY | |
|---|---|
| % Solids Polymer | Brookfield Viscosity (cP) |
| 64 | 81,000,000 |

EXAMPLE 22

PHYSICAL PROPERTIES OF YET ANOTHER PRIOR-ART, UNCURED POLYOL POLYMER

A batch of polyol polymer was prepared, in accordance with the procedures set forth in EXAMPLE 4 of U.S. Pat. No. 4,005,155. Upon completion of the polymerization reaction, the prior-art polyol polymer was found to possess the following physical properties: $M_n=14180$, $M_w=244010$, $M_z=763500$, $M_w/M_n=17.21$, and $M_z/M_n=53.85$. A percent solids-viscosity value was arrived at utilizing the method described in EXAMPLE 21. The prior-art polyol exhibited the following percent solids-viscosity value:

TABLE XVIII

| PRIOR-ART POLYOL POLYMER VISCOSITY | |
|---|---|
| % Solids Polymer | Brookfield Viscosity (cP) |
| 70 | 324,000,000 |

EXAMPLE 23

PHYSICAL PROPERTIES OF STILL ANOTHER PRIOR-ART, UNCURED POLYOL POLYMER

A batch of polyol polymer was prepared in accordance with the procedures set forth in EXAMPLE 5 of the U.S. Pat. No. 4,005,155. Upon completion of the polymerization reaction the prior-art polyol polymer was found to possess the following physical properties: $M_n=10620$, $M_w=509,410$, $M_z=23,910,900$, $M_w/M_n=47.95$, and $M_z/M_n=2251.5$. A percent solids-viscosity value was arrived at utilizing the method described in EXAMPLE 21. This prior-art polyol exhibited the following percent solids-viscosity value:

TABLE XIX

| PRIOR-ART POLYOL POLYMER VISCOSITY | |
|---|---|
| % Solids Polymer | Brookfield Viscosity (cP) |
| 50 | >324,000,000 |

EXAMPLE 24

PHYSICAL PROPERTIES OF YET ANOTHER PRIOR-ART, UNCURED POLYOL POLYMER

A batch of polyol polymer was prepared, in accordance with the procedures set forth in EXAMPLES 1 and 3 of U.S. Pat. No. 3,892,714, for the purpose of further comparing yet another prior-art polyol to polyol polymer produced by the method of the present invention. Upon completion of the polymerization reaction, the prior-art polyol polymer produced as a result was found to possess the following physical properties: $M_n=12000$, $M_w=80000$, $M_z=163000$, $M_w/M_n=6.7$, and $M_z/M_n=13.7$. A percent solids-viscosity value was arrived at utilizing the method described in EXAMPLE 21. The prior-art polyol exhibited the following percent solids-viscosity value:

TABLE XX

| PRIOR-ART POLYOL POLYMER VISCOSITY | |
|---|---|
| % Solids Polymer | Brookfield Viscosity (cP) |
| 50 | 57,000,000 |

What has been described herein is a novel process for producing a polymer useful in a thermoset coating. Also described herein is the novel polymer so produced. While the process together with the polymer produced by the process have been described with reference to a number of preferred embodiments, the present invention is not limited thereto. On the contrary, alternatives, changes or modifications will become apparent to those skilled in the art upon reading the foregoing description. For example, as those skilled in the art will appreciate, not only 2-HEMA, 2-HEA (2-hydroxyethyl acrylate), and para-hydroxystyrene but also trans-4-hydroxystilbene as well as a number of other commercially-available compounds, each of which can function as an ethylenically-unsaturated monomer having a hydroxyl moiety, can be utilized, in accordance with the principles of the present invention. Thus, our discovery—that dual, noncatalytically-induced, thermally-initiated, substantially simultaneously-occurring mechanisms can be utilized to produce a desired polyol polymer—has not only resulted in a greatly simplified process and increased the potential for producing a desired thermoset polymer product at a significantly lower cost, but has also provided a novel polyol polymer having significantly improved physical properties as well. Our discoveries, furthermore, allow for the application of mixtures containing these novel polyol polymers to substrates at significantly greater polymer/solvent ratios without the production of the concomitantly higher viscosities generally associated with polyol polymers of this type, as previously described in the art. Accordingly, because greater polyol-to-solvent ratios than employed commercially are now feasible, a reduction in solvent emissions can be realized. Furthermore, the above-described SGA polymerization process is seen to produce, in particular, hydroxy-functional acrylic/-polyester hybrid polyol polymers which, in turn, can for example be utilized to produce thermoset films and coatings possessing greatly-enhanced scratch-resistance, flexibility and impact-resistance values, as compared to commercially-available thermoset films and coatings. Accordingly, the various alternatives briefly mentioned above, including other changes and modifications that will become apparent to those skilled in the art upon reading this disclosure, are to be considered as forming a part of the present invention insofar as they fall within spirit and scope of the appended claims.

We claim:

1. A polymerization process to produce a graft polymer useful in the production of a thermoset coating, the graft polymer being characterized as having at least one main chain and a plurality of side chains attached thereto, the polymerization process comprising the steps of:

combining in a solvent, at an elevated temperature and for a predetermined period of time an (1) addition-polymerizable monomer that is also a free-radical initiator together with an (2) ethylenically-unsaturated monomer having a nucleophilic or an electrophilic moiety, the elevated temperature being effective for initiating addition copolymerization of the addition-polymerizable monomer with the ethylenically-unsaturated monomer, wherein propagation by the addition-copolymerization reaction forms the main chain of the graft polymer;

while also combining in the solvent a polymerizable, carbonyl carbon-containing, ringed molecule at a pressure effective, at the elevated temperature, to cause the ring portion of the ringed molecule to open in the vicinity of the carbonyl carbon thereof in response to the presence of the nucleophilic or the electrophilic moiety of the ethylenically-unsaturated monomer, for initiating ionic-copolymerization of the polymerizable, ringed molecule with the nucleophilic-containing or electrophilic-containing moiety of the ethylenically-unsaturated monomer, wherein propagation by the ionic-copolymerization reaction forms the side chains of the graft polymer; and terminating both of the addition-copolymerization and the ionic-copolymerization reactions when the thus-produced graft polymer attains a predetermined number-average and/or weight-average molecular weight, the polymerization process being characterized in that each of the main-chain and side-chain propagations occurs substantially simultaneously, relative to the other, and wherein the polymerization process is further characterized in that the ionic-copolymerization reaction occurs expressly excluding utilization of a catalyst for the carbonyl carbon-containing ringed molecule.

2. The process of claim 1 further comprising the steps of: separating the polymer from the solvent; and recovering the polymer.

3. The process of claim 1 wherein the elevated temperature is about 100° to about 350° Centigrade, when styrene monomer is the addition-polymerizable monomer.

4. The process of claim 1 wherein the elevated temperature is about 150° to about 300° Centigrade, when styrene monomer is the addition-polymerizable monomer.

5. The process of claim 1 wherein the elevated temperature is about 190° to about 270° Centigrade, when styrene monomer is the addition-polymerizable monomer.

6. The process of claim 1 wherein the combining steps take place utilizing agitation.

7. The process of claim wherein the solvent is selected from the group consisting of butyl acetate, MAK, PM acetate, toluene, xylene, dimethyl cellosolve, glyme, diglyme, triglyme, diethyl carbitol, diethyl cellosolve, and cellosolve acetate.

8. The process of claim 1 wherein the polymerizable, carbonyl carbon-containing ringed molecule is selected from the group consisting of caprolactam, cyclic ether, cyclic anhydride, cyclic carbonate, cyclic oxalate, and lactone.

9. The process of claim 1 wherein the polymerizable, carbonyl carbon-containing ringed molecule is selected from the group consisting of beta-propiolactone, alpha,alpha-bis(chloromethyl)propiolactone, beta-butyrolactone, delta-valerolactone, alpha,beta,gamma-trimethoxy-delta-valerolactone, 1,4-dioxane-2-one, glycolide, lactide, 1,4-dithiane-2,5-dione, trimethylene carbonate, neopentyl carbonate, ethylene oxalate, beta-methyl-epsilon-isopropyl-epsilon-caprolactone, propylene oxalate, epsilon-caprolactone, and lactones of 4-hydroxylcyclohexanecarboxylic acid, cis-disalicylide, di-o-cresotide, and trisalicylide.

10. The process of claim 1 wherein the nucleophilic moiety comprises a hydroxyl moiety.

11. The process of claim 10 wherein the monomer having the hydroxyl moiety is selected from the group consisting of hydroxyalkyl acrylates, hydroxyalkyl methacrylates, and methyl alpha-hydroxyalkyl acrylates.

12. The process of claim 1 wherein the ethylenically-unsaturated monomer is selected from the group consisting of an acrylate, a methacrylate, and other monomers capable of being polymerized by free-radical addition polymerization.

13. The process of claim 1 wherein the polymerizable free-radical initiator is selected from the group consisting of styrene, alpha-methyl styrene, vinyl toluene, para-methyl styrene, and tertiary-butyl styrene.

14. The process of claim 1 wherein the terminating step is effected when the number-average molecular weight of the polymer is about 700 to about 15,000.

15. The process of claim 1 wherein the terminating step is effected when the number-average molecular weight of the polymer is about 1,000 to about 10,000.

16. The process of claim 1 wherein the terminating step is effected when the number-average molecular weight of the polymer is about 1,500 to about 7,000.

17. Polyol polymer made according to the process of claim 1.

* * * * *

UNITED STATES PATENT AND TRADEMARK OFFICE
CERTIFICATE OF CORRECTION

PATENT NO. :   4,933,430

DATED      :   June 12, 1990

INVENTOR(S) :  Kessler et al.

It is certified that error appears in the above-identified patent and that said Letters Patent is hereby corrected as shown below:

Column 11, lines 15-21, please delete the structure depicted as

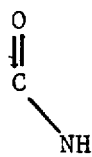

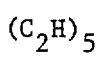

and in place thereof, please insert the following structure

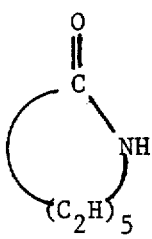

UNITED STATES PATENT AND TRADEMARK OFFICE
CERTIFICATE OF CORRECTION

PATENT NO. : 4,933,430

DATED : June 12, 1990

INVENTOR(S) : Kessler et al.

It is certified that error appears in the above-identified patent and that said Letters Patent is hereby corrected as shown below:

Column 15, line 31, please substitute the expression "$M_z/M_n -15.45$" with the expression -- $M_z/M_n = 15.45$ --.

Signed and Sealed this

Twenty-ninth Day of October, 1991

Attest:

HARRY F. MANBECK, JR.

Attesting Officer

Commissioner of Patents and Trademarks